United States Patent
Maria et al.

(10) Patent No.: US 11,032,239 B1
(45) Date of Patent: Jun. 8, 2021

(54) METHODS AND SYSTEMS FOR PROVIDING GLOBAL INTERNET PROTOCOL (IP) ADDRESSES

(71) Applicants: AT&T Intellectual Property I, L.P., Atlanta, GA (US); AT&T Mobility II LLC, Atlanta, GA (US)

(72) Inventors: Arturo Maria, Bellevue, WA (US); Jeffrey Joseph Farah, North Brunswick, NJ (US)

(73) Assignees: AT&T Intellectual Propety I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 16/704,954

(22) Filed: Dec. 5, 2019

(51) Int. Cl.
*H04L 29/12* (2006.01)
*H04W 8/18* (2009.01)
(Continued)

(52) U.S. Cl.
CPC ........ *H04L 61/2514* (2013.01); *H04L 61/251* (2013.01); *H04L 61/6022* (2013.01);
(Continued)

(58) Field of Classification Search
None
See application file for complete search history.

(56) References Cited

U.S. PATENT DOCUMENTS 5,835,971 A * 11/1998 Ikeda .................. G06F 9/34
711/220
6,002,931 A * 12/1999 Yamaguchi .......... H04W 8/06
379/201.01

(Continued)

FOREIGN PATENT DOCUMENTS

KR 20130117436 A 10/2013
WO 2015080553 A1 6/2015
WO 2018188759 A1 10/2018

OTHER PUBLICATIONS

Ayoub, Wael et al., Internet of mobile things: Overview of lorawan, dash7, and nb-iot in lpwans standards and supported mobility; IEEE Communications Surveys & Tutorials 21.2 (2018): 1561-1581.
Chen, Min et al., Narrow band internet of things; IEEE access 5 (2017): 20557-20577.

(Continued)

*Primary Examiner* — Lashonda T Jacobs
(74) *Attorney, Agent, or Firm* — Guntin & Gust, PLC; Matthew Tropper

(57) ABSTRACT

Aspects of the subject disclosure may include, for example, receiving, from a first network, a first request for a first global internet protocol (IP) address that is to be allocated to a first device that is provisioned on the first network, the first device being provisioned on the first network prior to allocation of the first global IP address, the first device being provisioned on the first network via use of a first subscriber identity that is associated with the first device and that is recognized by the first network, the first request including the first subscriber identity; generating, responsive to the first request, the first global IP address, the first global IP address enabling communication with the first device when the first device is subsequently registered on a second network, the first subscriber identity being stored in a database as corresponding to the first global IP address that is generated; and sending, to the first network, the first global IP address that had been generated. Other embodiments are disclosed.

20 Claims, 10 Drawing Sheets

(51) Int. Cl.
*H04W 8/26* (2009.01)
*H04L 29/08* (2006.01)
*H04W 4/70* (2018.01)

(52) U.S. Cl.
CPC .............. *H04L 67/12* (2013.01); *H04W 4/70* (2018.02); *H04W 8/18* (2013.01); *H04W 8/26* (2013.01)

(56) References Cited

U.S. PATENT DOCUMENTS

| | | | |
|---|---|---|---|
| 6,810,250 B2 * | 10/2004 | Jo | H04W 8/12 455/432.1 |
| 7,945,262 B2 * | 5/2011 | Elkarat | H04W 8/06 455/435.1 |
| 8,077,711 B2 * | 12/2011 | Okamoto | H04L 29/125 370/389 |
| 8,316,152 B2 | 11/2012 | Geltner et al. | |
| 8,891,423 B2 | 11/2014 | Shaheen et al. | |
| 9,094,790 B2 | 7/2015 | Foti et al. | |
| 9,185,673 B2 | 11/2015 | Shaheen | |
| 9,363,839 B2 | 6/2016 | Zhao et al. | |
| 9,497,102 B2 | 11/2016 | Cherian et al. | |
| 9,774,709 B2 | 9/2017 | Bhagwat et al. | |
| 9,794,327 B2 | 10/2017 | Pareglio et al. | |
| 10,038,634 B2 | 7/2018 | Cheng | |
| 10,129,202 B2 | 11/2018 | Hui et al. | |
| 10,212,261 B2 | 2/2019 | Govindaraju et al. | |
| 10,231,106 B2 | 3/2019 | Koshimizu et al. | |
| 10,313,202 B2 | 6/2019 | Lindsey et al. | |
| 10,524,116 B2 * | 12/2019 | Xu | H04L 61/2061 |
| 2002/0186693 A1 * | 12/2002 | Inoue | H04L 29/12311 370/389 |
| 2009/0165091 A1 * | 6/2009 | Liang | H04L 63/0892 726/3 |
| 2010/0115080 A1 * | 5/2010 | Kageyama | H04L 29/12028 709/223 |
| 2012/0106431 A1 | 5/2012 | Wu et al. | |
| 2014/0177505 A1 * | 6/2014 | Arkko | H04W 84/10 370/312 |
| 2016/0044441 A1 | 2/2016 | Shaheen | |
| 2016/0294828 A1 * | 10/2016 | Zakaria | H04W 4/70 |
| 2017/0063798 A1 * | 3/2017 | Lapidous | H04L 63/029 |
| 2017/0244629 A1 * | 8/2017 | Kodaypak | H04W 76/10 |
| 2018/0007140 A1 * | 1/2018 | Brickell | H04L 67/42 |
| 2018/0160358 A1 | 6/2018 | Nenner et al. | |
| 2019/0044794 A1 | 2/2019 | Chew | |
| 2019/0124573 A1 | 4/2019 | Yin et al. | |
| 2019/0166088 A1 | 5/2019 | Krochik et al. | |
| 2019/0215734 A1 * | 7/2019 | Selvaganapathy | H04W 4/80 |
| 2020/0059976 A1 * | 2/2020 | Bhatia | H04W 76/11 |
| 2020/0076896 A1 * | 3/2020 | Anumala | H04L 12/28 |
| 2020/0389837 A1 * | 12/2020 | Funato | H04W 48/14 |

OTHER PUBLICATIONS

Mekki, Kais et al., A comparative study of LPWAN technologies for large-scale IoT deployment; ICT express 5.1 (2019): 1-7.

Spajic, Vlado, Narrowband internet of things; (2017); Infoteh-Jahorina, vol. 16, Mar. 2017, pp. 1-6.

* cited by examiner

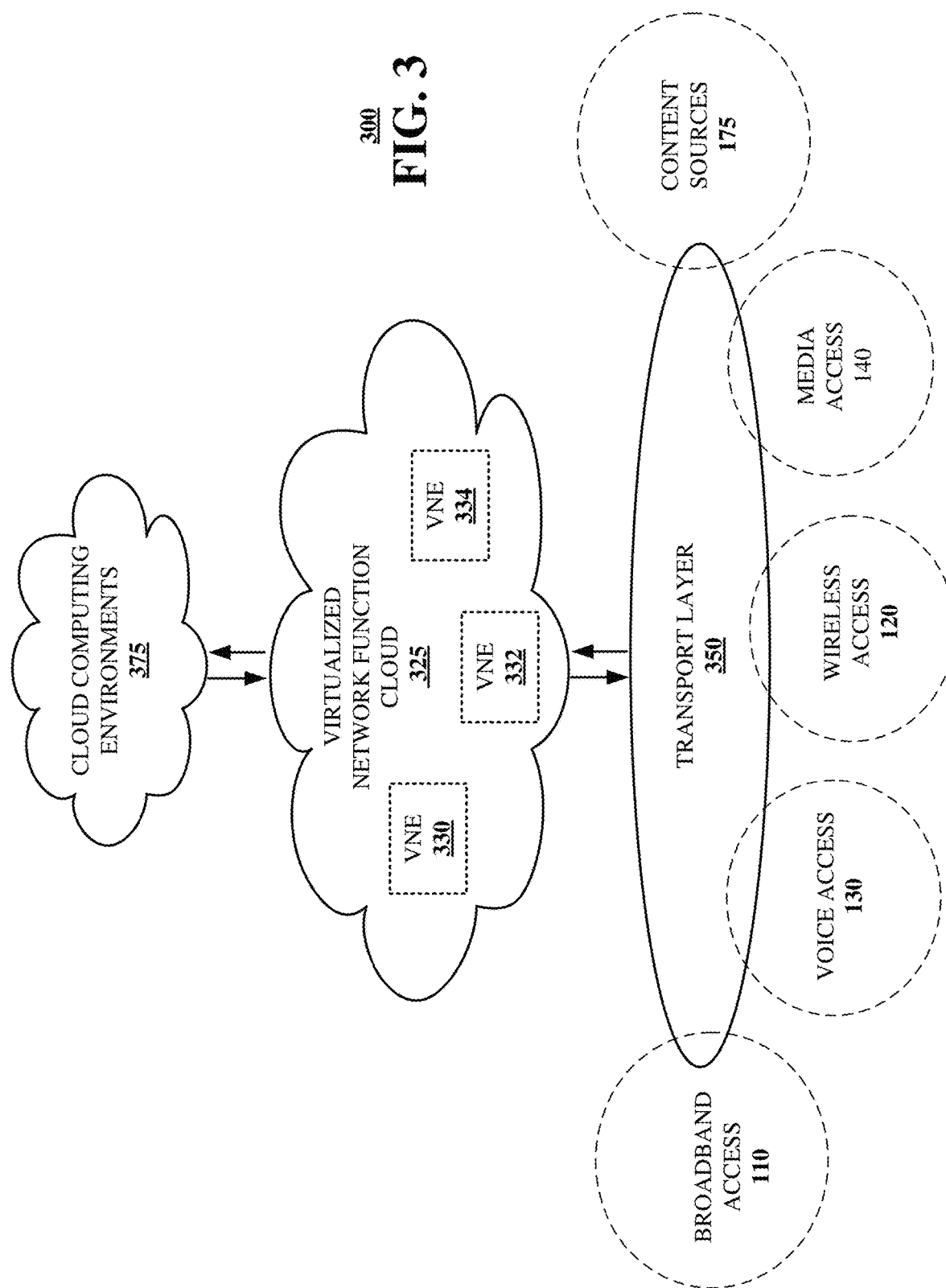

METHODS AND SYSTEMS FOR PROVIDING GLOBAL INTERNET PROTOCOL (IP) ADDRESSES

FIELD OF THE DISCLOSURE

The subject disclosure relates to methods and systems for providing global internet protocol (IP) addresses.

BACKGROUND

Internet protocol (IP) addresses assigned to individual internet-of-things (IoT) devices such as, for example, sensors, are often specific to an individual carrier network or an individual WiFi (WLAN) network. That is, when an IoT device connects to a network (such as LTE or 5G) of a particular telecommunications provider, a private IP address is typically assigned and this private IP address is network address translated to an external IP address. In other words, the device is typically assigned a private IP address within the network of the particular telecommunications provider and externally is addressed by one of the IP addresses that is owned by the particular telecommunications provider. The Layer 3 routers typically perform the network address translation (NAT) tasks. If the IoT device moves to a network of another telecommunications provider or to another enterprise (for example, a company that has a WiFi network), the IP address for the IoT device changes (such as via re-assignment by the new carrier or enterprise). This re-assignment can present a challenge to an IoT device (and/or to an application such as may reside on the IoT device or be external to the device) where a consistent IP address is expected. For example, re-assigning an IP address may impose connectivity and security challenges depending on the authentication and authorization scheme used for the IoT device.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
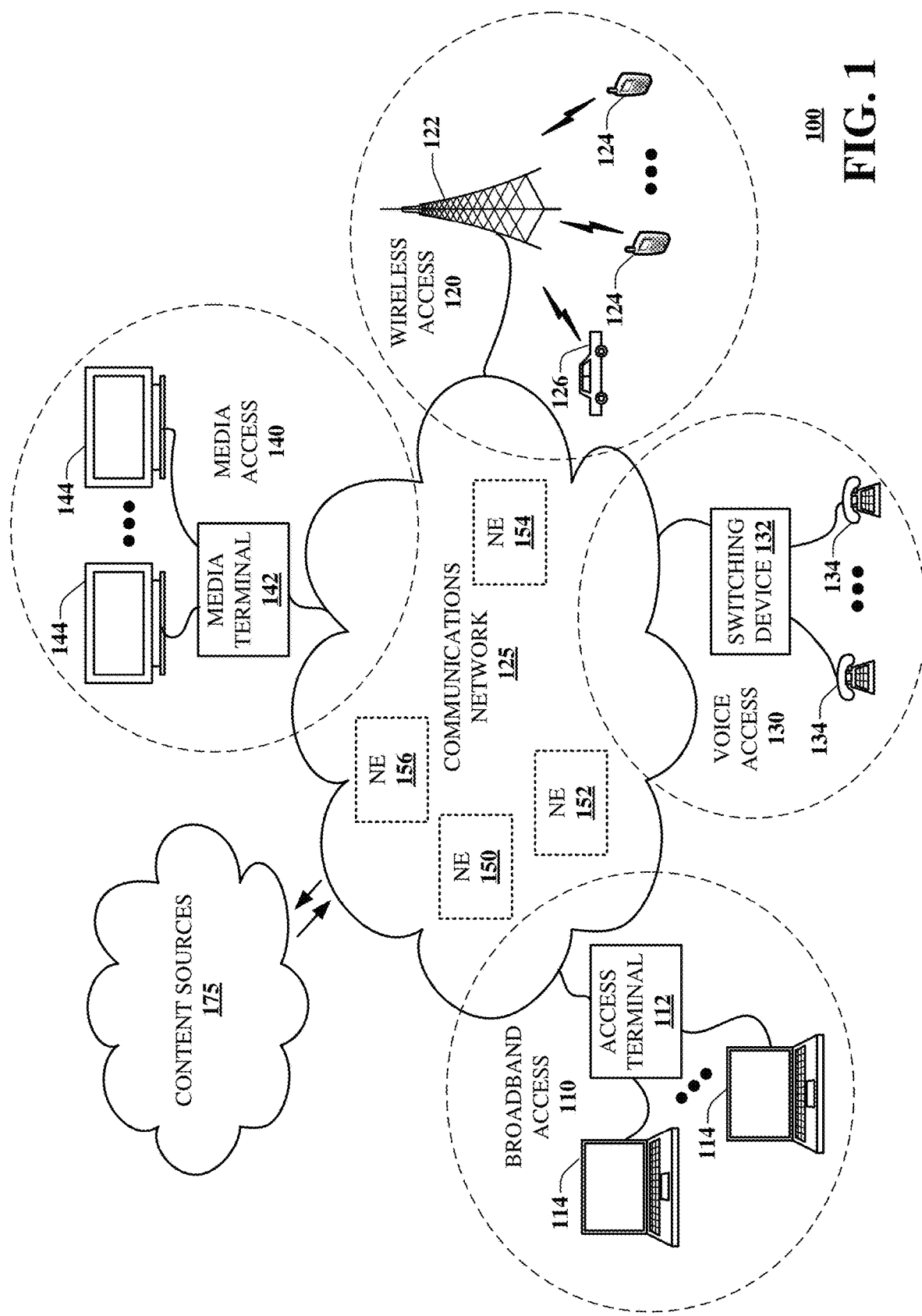
FIG. 1 is a block diagram illustrating an exemplary, non-limiting embodiment of a communication network in accordance with various aspects described herein.

The subject disclosure describes, among other things, illustrative embodiments for providing a consistent IP address across carriers and/or enterprises. Other embodiments are described in the subject disclosure.

One or more aspects of the subject disclosure include mechanisms for facilitating global IP address allocation/assignment.

In one example, provided is a cross-carrier IP address broker for internet-of-things (IoT) devices. The cross-carrier IP address broker can operate in a $5^{th}$ Generation (5G) environment (and beyond).

In one embodiment, an apparatus is provided, comprising: a processing system including a processor; and a memory that stores executable instructions that, when executed by the processing system, facilitate performance of operations, the operations comprising: receiving, from a first network, a first request for a first global internet protocol (IP) address that is to be allocated to a first device that is provisioned on the first network, the first device being provisioned on the first network prior to allocation of the first global IP address, the first device being provisioned on the first network via use of a first subscriber identity that is associated with the first device and that is recognized by the first network, the first request including the first subscriber identity; generating, responsive to the first request, the first global IP address, the first global IP address enabling communication with the first device when the first device is subsequently registered on a second network, the first subscriber identity being stored in a database as corresponding to the first global IP address that is generated; sending, to the first network, the first global IP address that had been generated; receiving, from the second network, a second request for a second global IP address that is to be allocated to a second device that is operative on the second network, the second device being registered on the second network prior to allocation of the second global IP address, the second device being registered on the second network via use of a second subscriber identity that is associated with the second device and that is recognized by the second network, the second request including the first subscriber identity; generating, responsive to the second request, the second IP global address, the second global IP address enabling communication with the second device when the second device is subsequently registered on the first network, the second subscriber identity being stored in the database as corresponding to the second global IP address that is generated; and sending, to the second network, the second global IP address that had been generated.

In another embodiment, a method is provided, comprising: receiving by a processing system of a global internet protocol (IP) address broker, from a first network, a request for a global IP address that is to be associated with a device that is registered on the first network, the device being registered on the first network via use of a subscriber identity that is associated with the device and that is recognized by the first network, the device being registered on the first network prior to association of the global IP address with the device, and the request including the subscriber identity; generating by the processing system, responsive to the request, the global IP address, the global IP address being associated in a database by the processing system along with the subscriber identity; sending, to the first network, the global IP address that had been generated; and determining by the processing system that the device is subsequently registered on a second network, the determining being based at least in part upon the global IP address being associated in the database along with the subscriber identity.

In another embodiment, a machine-readable medium is provided, the machine-readable medium of this embodiment comprising executable instructions that, when executed by a processing system of a first network including a processor, facilitate performance of operations, the operations comprising: receiving from a first device a first request for a connection to the first network, the first device having a first subscriber identity that is recognized by the first network and that is utilized to facilitate the connection; sending to a global internet protocol (IP) address broker outside of the first network, responsive to the first request from the first device, a second request for a first global IP address that is to be associated with the first device, the second request including a characteristic of the first device; and receiving from the global IP address broker, responsive to the second request, the first global IP address, the first global IP address having been generated by the global IP address broker based upon the characteristic of the first device, the first global IP address enabling communication by the first network with the first device when the first device is subsequently connected to a second network.

Using certain conventional mechanisms, a mobile device is typically authenticated (e.g., by UserID, certificate) when the mobile device moves (such as from one network to another). Various embodiments utilizing a global IP address can eliminate the need for such authentication when moving between networks (thus, facilitating device mobility).

Referring now to FIG. 1, a block diagram is shown illustrating an example, non-limiting embodiment of a communication network 100 in accordance with various aspects described herein. For example, communication network 100 can facilitate in whole or in part allocation/assignment (and/or sharing) of global IP addresses via use of a Global IP Address Broker (GIAB). For instance, communication network 100 can facilitate receiving, from a first network, a first request for a first global internet protocol (IP) address that is to be allocated to a first device that is provisioned on the first network, the first device being provisioned on the first network prior to allocation of the first global IP address, the first device being provisioned on the first network via use of a first subscriber identity that is associated with the first device and that is recognized by the first network, the first request including the first subscriber identity. Communication network 100 can further facilitate generating, responsive to the first request, the first global IP address, the first global IP address enabling communication with the first device when the first device is subsequently registered on a second network, the first subscriber identity being stored in a database as corresponding to the first global IP address that is generated. Communication network 100 can further facilitate sending, to the first network, the first global IP address that had been generated. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
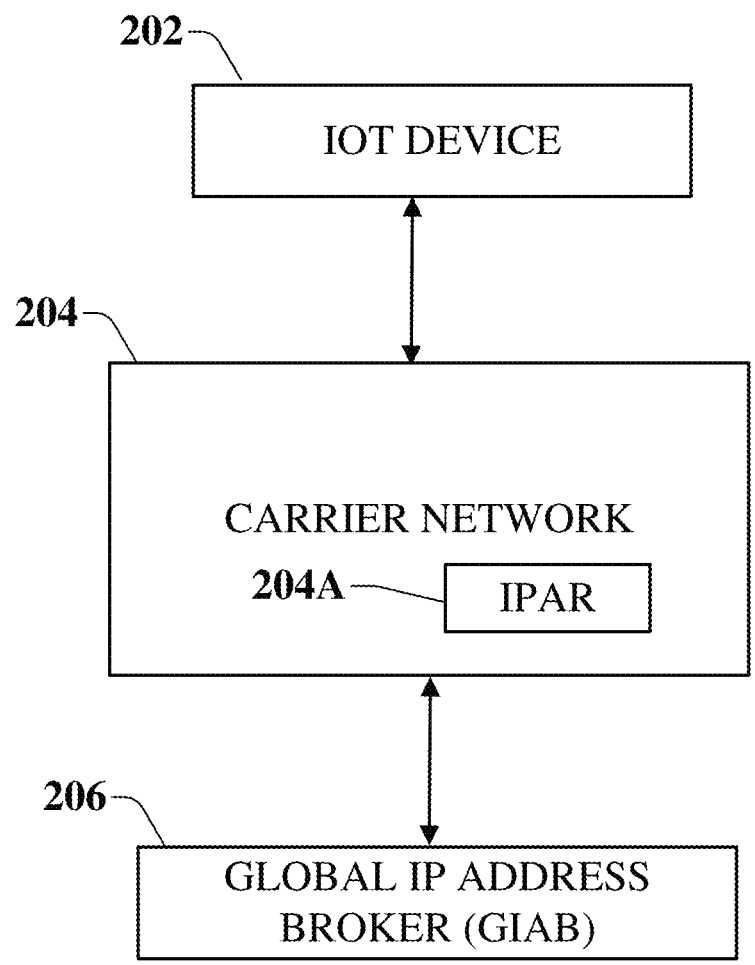
FIG. 2A is a block diagram illustrating an example, non-limiting embodiment of a system 200 functioning within the communication network of FIG. 1 in accordance with various aspects described herein.

Referring now to FIG. 2A, a three-tiered configuration of a system 200 according to an embodiment is shown. As seen, this configuration comprises an individual IoT device 202 (e.g., a sensor) that requests a connection to a carrier network 204 (in another example, the IoT device 202 can request a connection instead to an enterprise network such as at a workplace or a public location such as a restaurant, hotel lobby, or airport). The carrier network 204 includes a carrier-based IP address requestor or IPAR 204A (in the enterprise network example, the IPAR would be enterprise-based). The carrier (or enterprise) network 204 can comprise one or more servers. The IPAR 204A interfaces with a Global IP Address Broker (GIAB) 206, which in this example resides outside of the carrier (or enterprise) network. The GIAB 206 contains (and/or has access to) a very large number of IP addresses that can be allocated (or assigned) to various devices (such as sensors or other IoT devices). The GIAB can comprise one or more servers. The GIAB can comprise one or more storage elements (such as one or more databases) for storing the global IP addresses along with associated information. In various examples, the associated information can include for each stored global IP address: a unique identifier for the respective device; subscriber information for the respective device (e.g., carrier network subscriber information and/or enterprise network subscriber information); a current network on which each respective device is operable (and/or registered and/or provisioned); one or more prior networks on which each respective device had been operative (and/or registered and/or provisioned); or any combination thereof. Of course, the configuration of FIG. 2A can be applied to any desired number of devices (e.g., IoT devices), each of which may operatively communicate with a respective carrier (or enterprise) network. Further, the configuration of FIG. 2A can be applied to any desired number of carrier (or enterprise) networks, each of which may operatively communicate with the Global IP Address Broker.

Figure 2B:
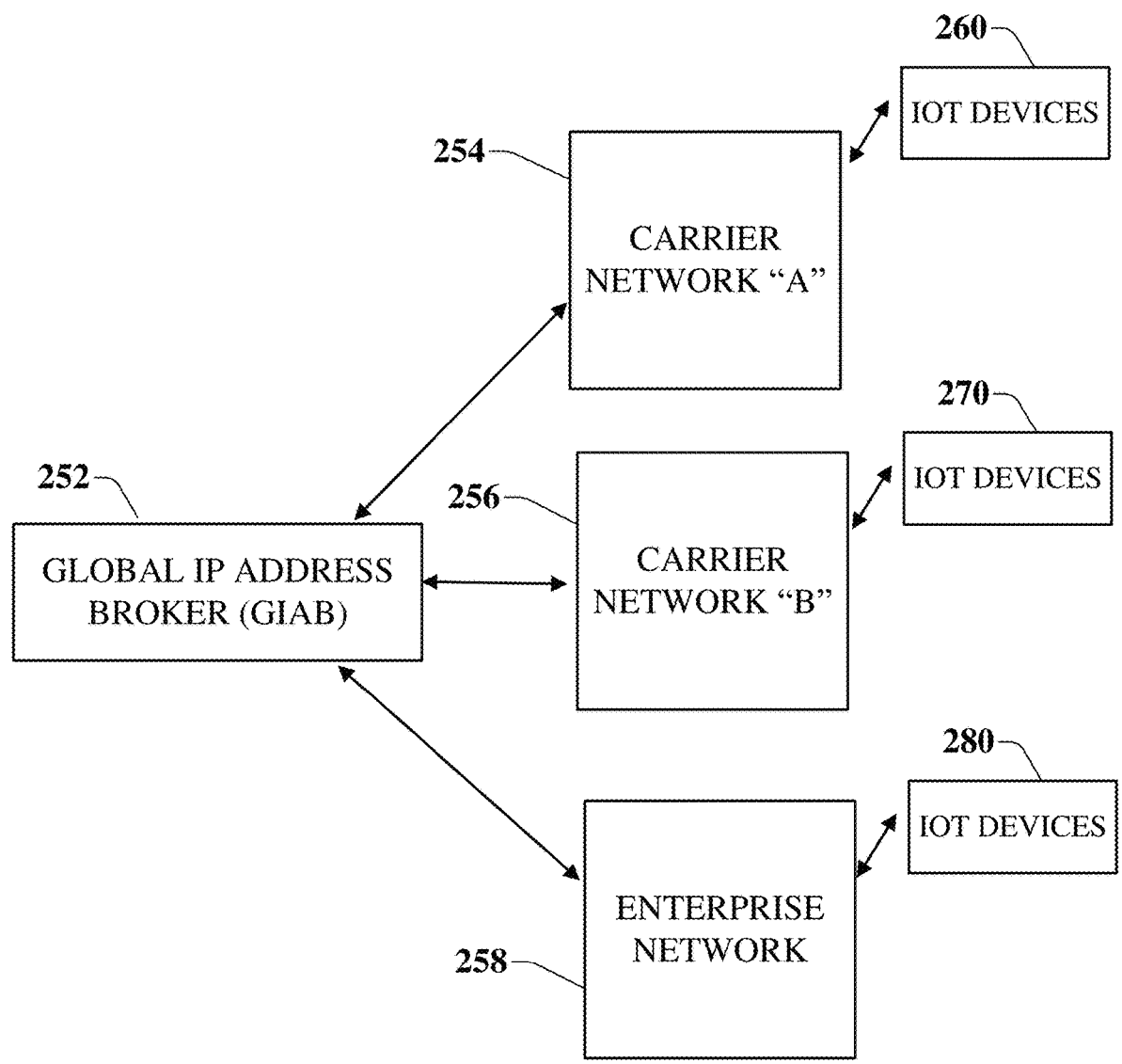
FIG. 2B is a block diagram illustrating an example, non-limiting embodiment of a system 250 functioning within the communication network of FIG. 1 in accordance with various aspects described herein.

Referring now to FIG. 2B, an example configuration of a system 250 according to an embodiment is shown. As seen, Global IP Address Broker 252 can be in operative communication with Carrier Network "A" 254, carrier Network "B" 256 and Enterprise Network 258. Of course, Global IP Address Broker 252 can be in operative communication with any desired number of different carrier networks and/or with any desired number of different enterprise networks. Further, Carrier Network "A" 254 is in operative communication with any desired number of IoT Devices (shown here collectively as IOT Devices 260). Further still, Carrier Network "B" 256 is in operative communication with any desired number of IoT Devices (shown here collectively as IOT Devices 270). Further still, Enterprise Network 258 is in operative communication with any desired number of IoT Devices (shown here collectively as IOT Devices 280). In various embodiments, a global IP address allocated (or assigned) by the Global IP Address Broker for a given device can be sent to a particular network upon initial request by that particular network; the global IP address of that given device can then be communicated to and/or shared with one or more other networks (other than the original particular requesting network). In various embodiments, a global IP address allocated (or assigned) by the Global IP Address Broker for a given device can be utilized by one or more other networks (that is, other than the original particular requesting network) for communications with the given device. In various embodiments, as a given device (which has been allocated/assigned a global IP address) moves from a first network to another network, communications can be appropriately directed to the given device on the another (new) network.

In one or more embodiments, a process flow can be as follows:

Network Internal IP Request: An IoT device (e.g. sensor) requests connection to a carrier network (or to an enterprise/WLAN Network). The IoT device is then attached to an eNodeB or a gNodeB (5G). The xNodeB (that is, the eNodeB or the gNodeB) then communicates the request to an MME or control plane MME. The MME the determines based on a subscriber identity (such as contained in a subscriber identity module (SIM) of the device) whether or not the device requesting the connection is an IoT device as provisioned in the HSS of the network. If the device is indeed an IoT device as provisioned in the HSS of the network, then the MME requests an IP address from the carrier-based (or enterprise-based) IP address requestor (IPAR) of the network.

Network External IP Request: The IPAR of the network then contacts the Global IP Address Broker (GIAB). In one example, the GIAB can reside inside of the carrier (or enterprise) network. In another example, the GIAB can reside outside of the carrier (or enterprise) network.

IP Address Allocation/Assignment: The GIAB allocates (or assigns) a computed address (e.g. a computed IPV6 address) to the IoT which had originally requested the connection as mentioned above. In one example, the GIAB can be a Network Element which can be implemented as a multi-carrier service operated by a third party.

IP Address Derivation: The IP address which is allocated/assigned (to the IoT which had originally requested the connection as mentioned above) can be computed as a hash value using the MAC address of the IoT device and/or other value(s) such as the SIMID of the device. In one example, the MAC address can be obtained from one or more of the carrier network elements (e.g., MME). In another example, the MAC address can be obtained from the AP and the WLC in WLAN (WiFi) systems. In another example, the hash value that is computed can be in the format of an IPV6 address space.

IP Address Communication: The GIAB communicates the global IP address for the device (which is computed by the GIAB) to the IPAR of the network. The IPAR of the network then communicates the global IP address of the device to the MME and to other gateways (and routers) throughout the carrier network.

In one or more embodiments, the IP Address Allocation/Assignment aspects mentioned above can alternatively (or additionally) be as follows:

IP Address Allocation/Assignment in 5G Networks: In 5G networks, a user plane Global IP Address Broker (GIAB) can be implemented (uGIAB). The uGIAB can be able to compute a hash value as described above and allocate/assign the global IP address to the respective IoT device. The hash value can be recreated by other network elements such as the MME.

In various embodiments, the IoT device can be, for example, a sensor (e.g., audio sensor, light sensor), a light-producing device (e.g., a lightbulb), and audio-producing device (e.g., a speaker), or any combination thereof.

In various embodiments, the IoT device can be operable on any type of network connection (e.g., a WiFi network, an LTE network, a 5G network).

In various embodiments, the device to which a global IP address is allocated/assigned can have a Subscriber Identity Module (SIM) card.

In various embodiments, polling mechanisms can be used as a "keep alive check". For example, if a given device is determined to be no longer operable (e.g., no longer operable on one or more particular network(s), or no longer operable on any network) then a global IP address that had been allocated/assigned to that device can be made available for re-allocation/re-assignment to another device.

In various examples, following a first polling (e.g., by a Global IP Address Broker) that results in an inability to determine that a given device is operable on one or more networks, one or more subsequent pollings (e.g., by the Global IP Address Broker) can be performed. In one specific example, a set number of subsequent pollings can be performed. If, after the subsequent polling(s) (and/or after a set time period following the first polling) there is still an inability (e.g., by the Global IP Address Broker) to determine that a given device is operable on one or more networks, the global IP address that is currently allocated/assigned to that given device can be released (e.g., by the Global IP Address Broker) for re-allocation/re-assignment to another device.

In various embodiments, a determination (e.g., via one or more calculations) can be performed (e.g., by a Global IP Address Broker) as to a likelihood that a particular global IP address (e.g., that has been allocated/assigned by the Global IP Address Broker to a particular device) will be used again for communication to and/or from that particular device. For example, if the last communication to or from the particular global IP address of the particular device had occurred a long time in the past (e.g., more than a set number of year(s) in the past (such as 1, 5, 7, 10, 20 years), then a high likelihood can be assigned to the assumption that the particular device will not be using the particular global IP address again (that is, there will not be communications to or from the particular device using that particular global IP address). Further, if the last communication to or from the particular global IP address of the particular device had occurred a medium time in the past (e.g., between a set number of weeks in the past (such as between 1 and 51 weeks), then a medium likelihood can be assigned to the assumption that the particular device will not be using the particular global IP address again (that is, there will not be communications to or from the particular device using that particular global IP address). Further, if the last communication to or from the particular global IP address of the particular device had occurred a short time in the past (e.g., between a set number of days in the past (such as between 1 and 6 days), then a low likelihood can be assigned to the assumption that the particular device will not be using the particular global IP address again (that is, there will not be communications to or from the particular device using that particular global IP address). In one example, the determination with regard to likelihood can be based upon polling (e.g., periodic polling) of the device (such polling can be performed, for example, by one or more Global IP Address Brokers).

In various embodiments, a network (e.g., a carrier network or an enterprise network) can monitor communications and determine that a communication to a device is using a particular global IP address to identify the device. In a case that the network determines that the particular global IP address is no longer being used by the device (such as the device being inoperative or not connected), the network can take action (such as informing the source of the communication that the particular global IP address is no longer being used by the device, intercepting the communication, informing one or more Global IP Address Brokers that the particular global IP address is no longer being used by the device or any combination thereof). In one example, a Global IP Address Broker that is informed (such as via an error message sent from a network (e.g., a carrier network or an enterprise network)) that a particular global IP address is no longer being used by a particular device can take action (such as disassociating (e.g., in a database) the particular global IP address from the particular device, releasing the particular global IP address for re-allocation/re-assignment; re-allocating/re-assigning the particular global IP address to another device, or any combination thereof).

In various embodiments, IPV6 can be used in combination with other information (e.g., a MAC address and/or a subscriber identity) to provide an identity mechanism.

In various embodiments, a particular global IP address can be allocated/assigned to a particular device on a particular network, and the particular network can be thought of as an "owner" of that particular global IP address and/or of that particular device.

In various embodiments, a particular global IP address can be allocated/assigned to a particular device on a particular network, and the corresponding particular subscriber (e.g., carrier customer) can be thought of as an "owner" of that particular IP address and/or of that particular device.

In one example, a device (e.g., an IoT device) owned by a particular person can be moved from one location (e.g., one house) to another location (e.g., another house). In one specific example, the physical location of the IoT device can be tracked (e.g., by a Global IP Address Broker). In another specific example, a network on which the device is currently operable/registered/provisioned (and/or one or more networks on which the device had been operable/registered/provisioned) can be tracked (e.g., by a Global IP Address Broker). In another specific example, a Global IP Address Broker can track a device (e.g., an IoT device) based upon subscriber information.

In one example, a device can be located at a house. The device can be a master IoT device. A transfer of ownership of an IP address (e.g., a global IP address) of the master IoT device can be detected and/or can occur upon a sale of the house.

In one example, an ownership change can be detected because a network on which a device (e.g., an IoT device) is operating/has been registered/has been provisioned has changed. Such ownership change detection can be facilitated, for example, based upon known subscriber information coupled with IoT identification information that has not changed.

In various embodiments, an "edge" network can be facilitated. In one example, a person has a number of devices. Some or all of the person's devices can become an "edge" (hop on/hop off point) to the network to which the devices connect.

In various embodiments, national boundary issues can be mitigated (e.g., in the context of device mobility).

In various embodiments, a Global IP Address Broker can be thought of as a master router.

In various embodiments, one or more aspects described herein can be applicable to vehicles (e.g., cars), components of vehicles (e.g., components of cars), devices in vehicles (e.g., devices in cars), or any combination thereof.

In various embodiments, functionality of a Global IP Address Broker can be dynamic and can facilitate cross-carrier functionality (e.g., communications across autonomous systems).

In various embodiments, one or more interfaces can be provided via one or more application programming interfaces (API's), one or more IP connections, one or more SS7 connections, or any combination thereof.

In various embodiments, a plurality of Global IP Address Brokers (such as in one or more subnetworks) can perform the underlying management and/or control.

In various embodiments, a Global IP Address Broker can be implemented via one or more virtual network functions (e.g., not tied to specific hardware or to specific applications).

In various embodiments, a Global IP Address Broker can facilitate connectivity anywhere at any time.

In various embodiments, a connection can be optimized depending upon the type of a device.

In various embodiments, a consistent IP address can be provided for each of a plurality of IoT devices.

In various embodiments, a Global IP Address Broker, which can be placed outside of the carrier/enterprise network(s) (such as in the cloud) can be provided. In one example, the Global IP Address Broker can communicate across carriers and/or across WLAN networks.

In various embodiments, a mechanism can be provided via which an IoT device requests connection to a network (e.g., LTE network, 5G network, and/or WiFi network). A network-based (e.g., carrier-based or enterprise-based) network element can request an IP address (e.g., a global IP address) from a Global IP Address Broker. The global IP address provided by the Global IP Address Broker can then be allocated/assigned to the IoT device. The global IP address can be derived as a hash value based on the MAC address of the IoT device and/or based upon other information (IPV6 can accommodate a very large number of IP addresses that can be shared, for example, by common agreement). In various embodiments, the global IP address that is allocated/assigned remains consistent whether a given IoT device is connected to the original carrier/network (the carrier/network which had originally requested the global IP address from the Global IP Address Broker) or another carrier/network (e.g., one or more subsequent carrier(s)/network(s) to which the given IoT is (or was) connected.

In various embodiments, one or more networks (e.g., carrier networks, WiFi networks) that have access to the Global IP Address Broker can request one or more global IP address (e.g., one or more of a number of previously agreed upon IP addresses).

In various embodiments, one or more networks (e.g., carrier networks, WiFi networks) that have access to the Global IP Address Broker can receive for one or more devices identification of one or more respective global IP address (e.g., one or more of a number of previously agreed upon IP addresses).

In various embodiments, one or more networks (e.g., carrier networks, WiFi networks) that have access to the Global IP Address Broker can utilize for one or more devices (to facilitate communications) one or more respective global IP address (e.g., one or more of a number of previously agreed upon IP addresses).

In various embodiments, a three tier architecture can be provided in order to present and allocate/assign a consistent IP address across carriers and enterprises (such embodiments can be facilitated via use of the large number of IP addresses available in an IPV6 environment).

In various embodiments, Global IP Address Broker services can be provided by a carrier to monetize, for example, IPV6 address space of the carrier.

In various embodiments, as the owner of a device (e.g., a subscriber on a carrier-based network) changes, the corresponding ownership information can then be updated (e.g., dynamically updated) in a database of global IP addresses.

In various embodiments, if the device connection has changed to another owner (e.g., another carrier network), the global IP address allocation/assignment can follow the device (the following of the device can include, for example, dynamically updating information in a database).

In various embodiments, a global IP address allocation/assignment can follow a device (e.g., based upon one or more owners whose identification(s) are stored in a database).

In various embodiments, a Global IP Address Broker can cooperate with one or more conventional domain name server (DNS) services to enable cross-carrier activities.

In various embodiments, routing to the particular IP address (e.g., global IP address) that is allocated/assigned can be done in various ways including (but not limited to) centralized routing from the Global IP Address Broker to individual networks (e.g., carriers or enterprises).

In various embodiments, a Global IP Address Broker can know at any given time which device is associated with which global IP address (e.g., via storage of appropriate information in a database).

In various embodiments, one carrier can implement one or more aspects of the subject disclosure to provide a consistent IP address across multiple carriers and/or across multiple enterprises. In one example, enabling a consistent IP address across carriers/networks could provide various monetization opportunities to an entity that provides such functionality.

Figure 2C:
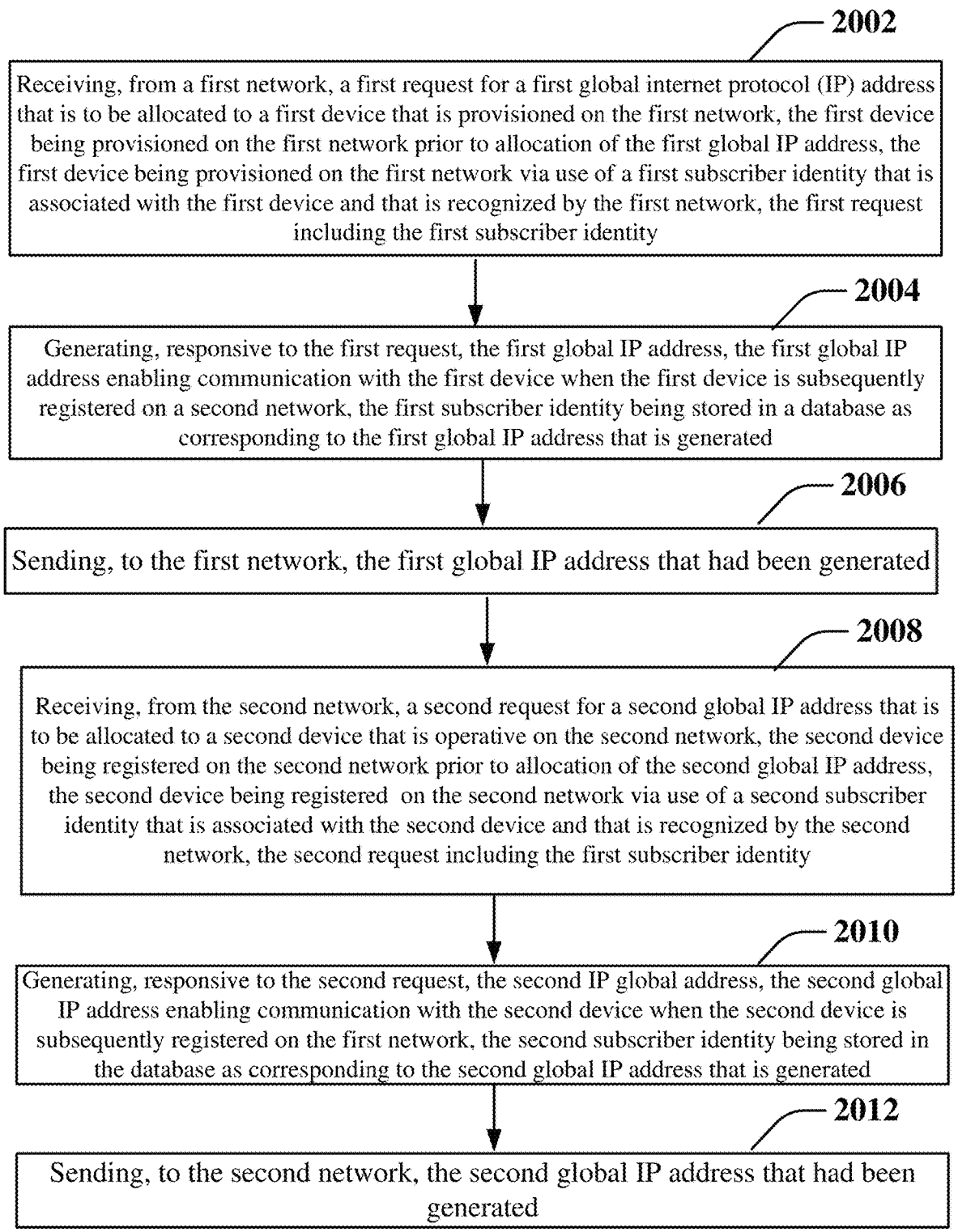
FIG. 2C depicts an illustrative embodiment of a method in accordance with various aspects described herein.

Referring now to FIG. 2C, various steps of a method 2000 according to an embodiment are shown. As seen in this FIG. 2C, step 2002 comprises receiving, from a first network, a first request for a first global internet protocol (IP) address that is to be allocated to a first device that is provisioned on the first network, the first device being provisioned on the first network prior to allocation of the first global IP address, the first device being provisioned on the first network via use of a first subscriber identity that is associated with the first device and that is recognized by the first network, the first request including the first subscriber identity. Next, step 2004 comprises generating, responsive to the first request, the first global IP address, the first global IP address enabling communication with the first device when the first device is subsequently registered on a second network, the first subscriber identity being stored in a database as corresponding to the first global IP address that is generated. Next, step 2006 comprises sending, to the first network, the first global IP address that had been generated. Next, step 2008 comprises receiving, from the second network, a second request for a second global IP address that is to be allocated to a second device that is operative on the second network, the second device being registered on the second network prior to allocation of the second global IP address, the second device being registered on the second network via use of a second subscriber identity that is associated with the second device and that is recognized by the second network, the second request including the first subscriber identity. Next, step 2010 comprises generating, responsive to the second request, the second IP global address, the second global IP address enabling communication with the second device when the second device is subsequently registered on the first network, the second subscriber identity being stored in the database as corresponding to the second global IP address that is generated. Next, step 2012 comprises sending, to the second network, the second global IP address that had been generated.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2D:
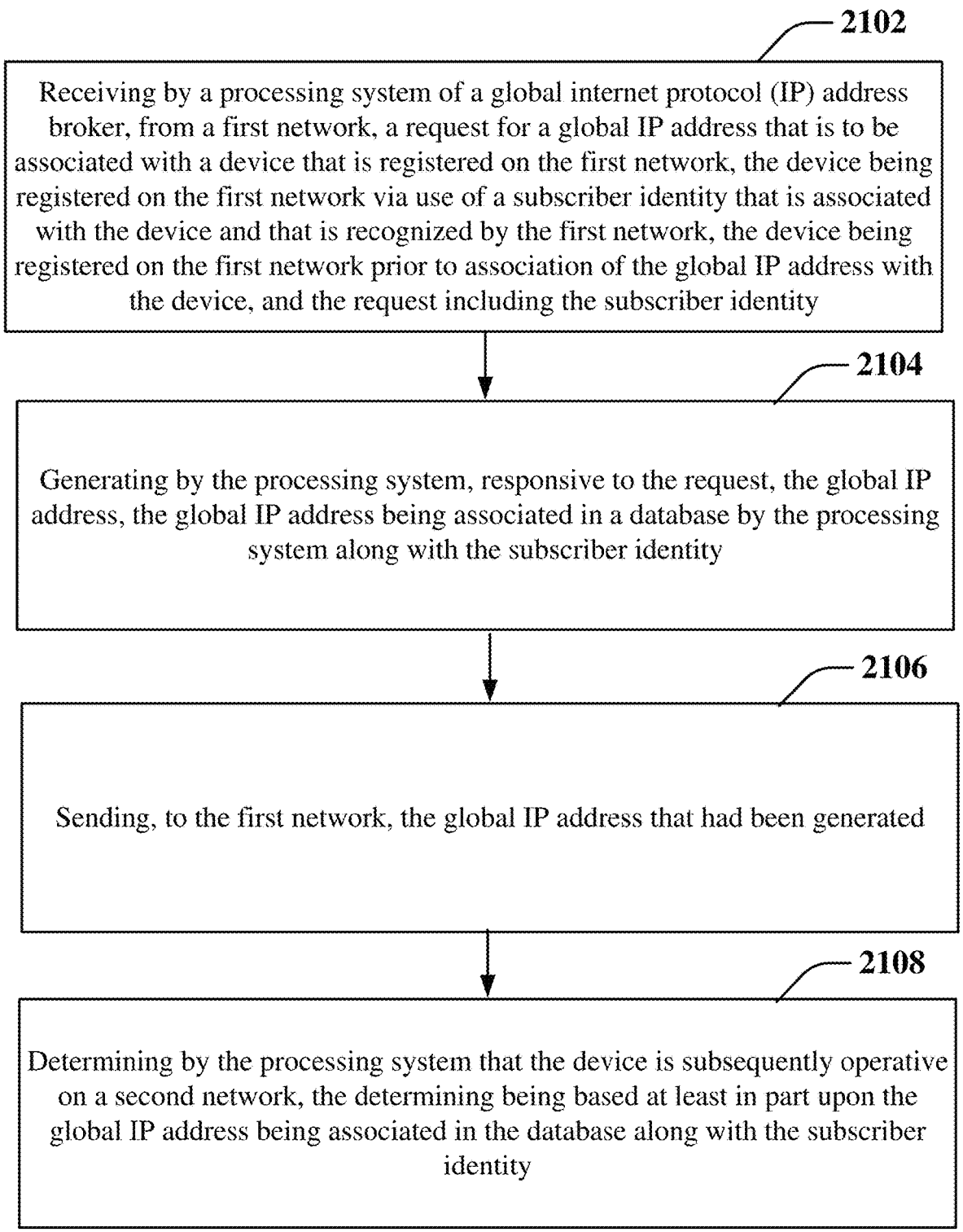
FIG. 2D depicts an illustrative embodiment of a method in accordance with various aspects described herein.

Referring now to FIG. 2D, various steps of a method 2100 according to an embodiment are shown. As seen in this FIG. 2D, step 2102 comprises receiving by a processing system of a global internet protocol (IP) address broker, from a first network, a request for a global IP address that is to be associated with a device that is registered on the first network, the device being registered on the first network via use of a subscriber identity that is associated with the device and that is recognized by the first network, the device being registered on the first network prior to association of the global IP address with the device, and the request including the subscriber identity. Next, step 2104 comprises generating by the processing system, responsive to the request, the global IP address, the global IP address being associated in a database by the processing system along with the subscriber identity. Next, step 2106 comprises sending, to the first network, the global IP address that had been generated. Next, step 2108 comprises determining by the processing system that the device is subsequently registered on a second network, the determining being based at least in part upon the global IP address being associated in the database along with the subscriber identity.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2E:
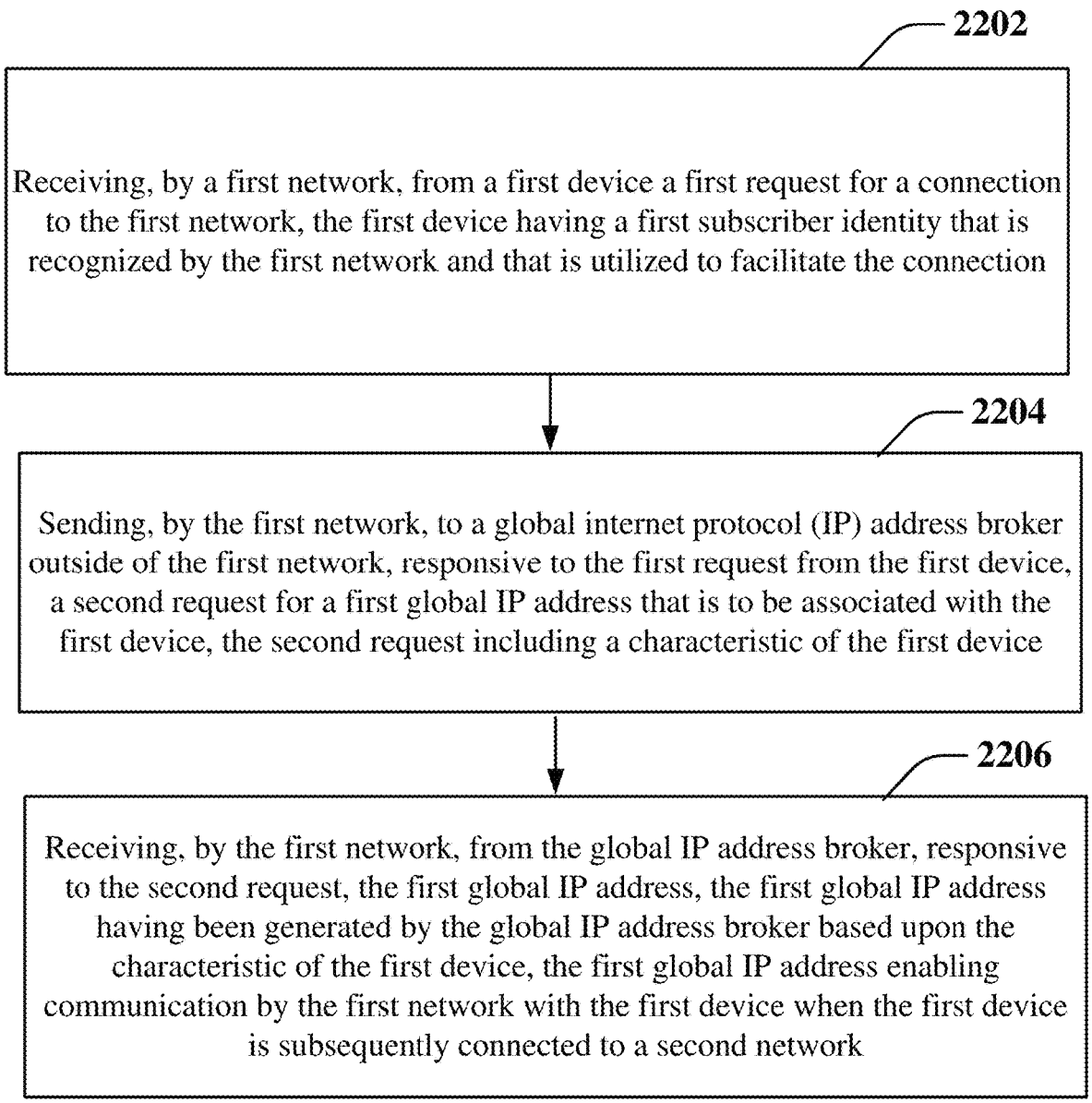
FIG. 2E depicts an illustrative embodiment of a method in accordance with various aspects described herein.

Referring now to FIG. 2E, various steps of a method 2200 according to an embodiment are shown. As seen in this FIG. 2E, step 2202 comprises receiving, by a first network, from a first device a first request for a connection to the first network, the first device having a first subscriber identity that is recognized by the first network and that is utilized to facilitate the connection. Next, step 2204 comprises sending, by the first network, to a global internet protocol (IP) address broker outside of the first network, responsive to the first request from the first device, a second request for a first global IP address that is to be associated with the first device, the second request including a characteristic of the first device. Next, step 2206 comprises receiving, by the first network, from the global IP address broker, responsive to the second request, the first global IP address, the first global IP address having been generated by the global IP address broker based upon a characteristic of the first device, the first global IP address enabling communication by the first network with the first device when the first device is subsequently connected to a second network.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, some or all of the subsystems and functions of systems 200 and 250, and some or all of methods 2000, 2100 and 2200 presented in FIGS. 1, 2A, 2B, 2C, 2D, and 2E. For example, virtualized communication network 300 can facilitate in whole or in part allocation/assignment (and/or sharing) of global IP addresses via use of a Global IP Address Broker.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
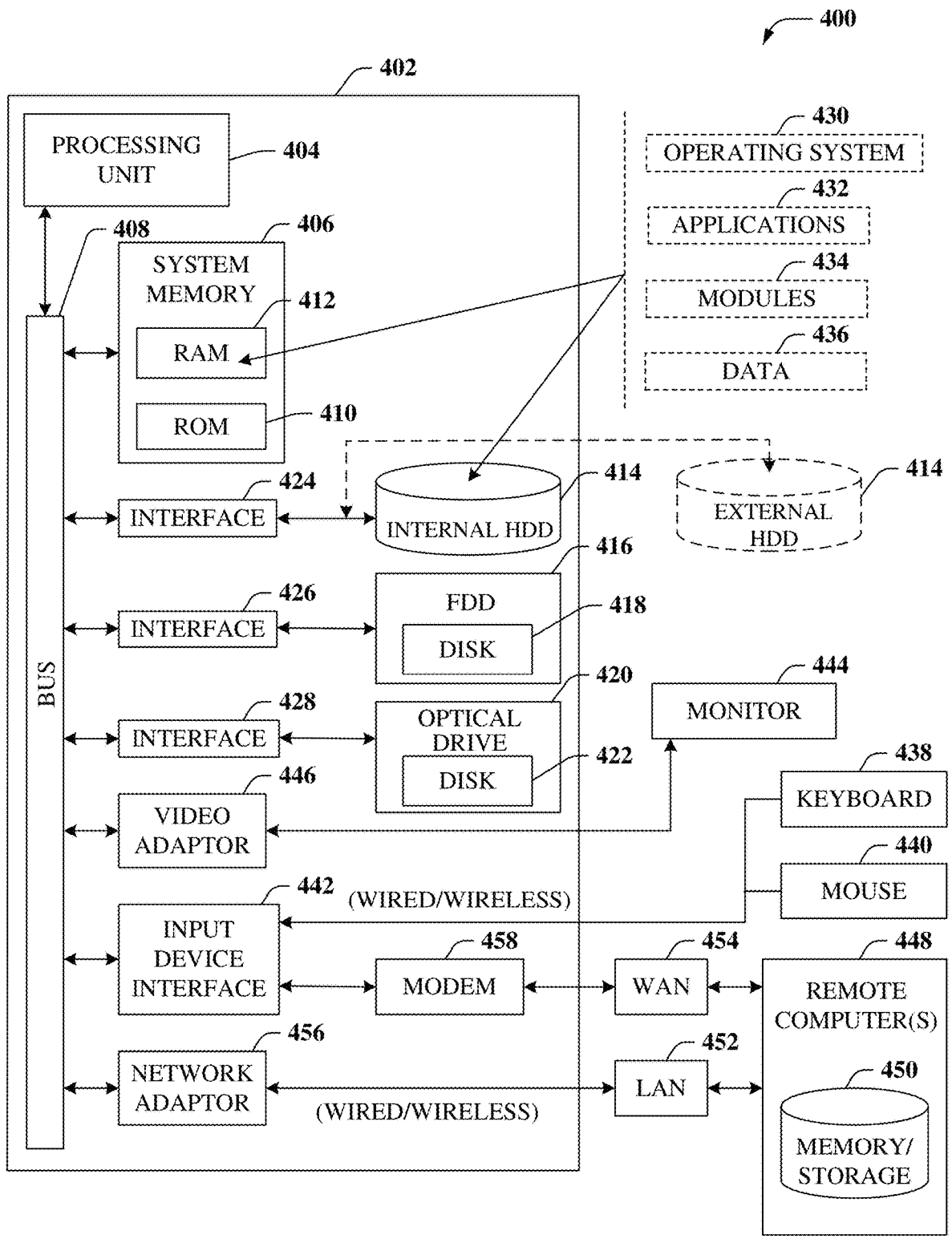
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part allocation/assignment (and/or sharing) of global IP addresses via use of a Global IP Address Broker.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies.

Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
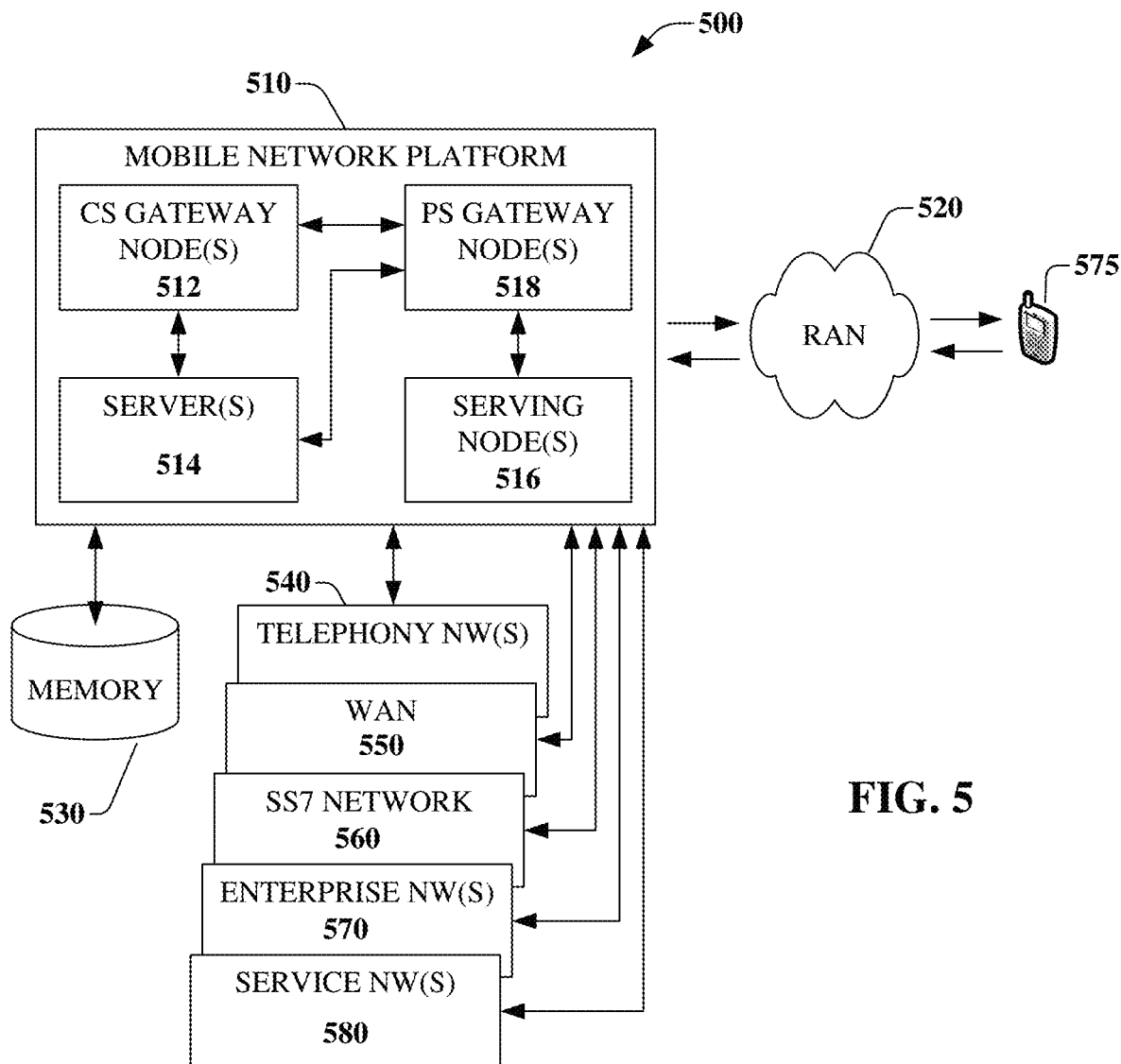
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part allocation/assignment (and/or sharing) of global IP addresses via use of a Global IP Address Broker. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
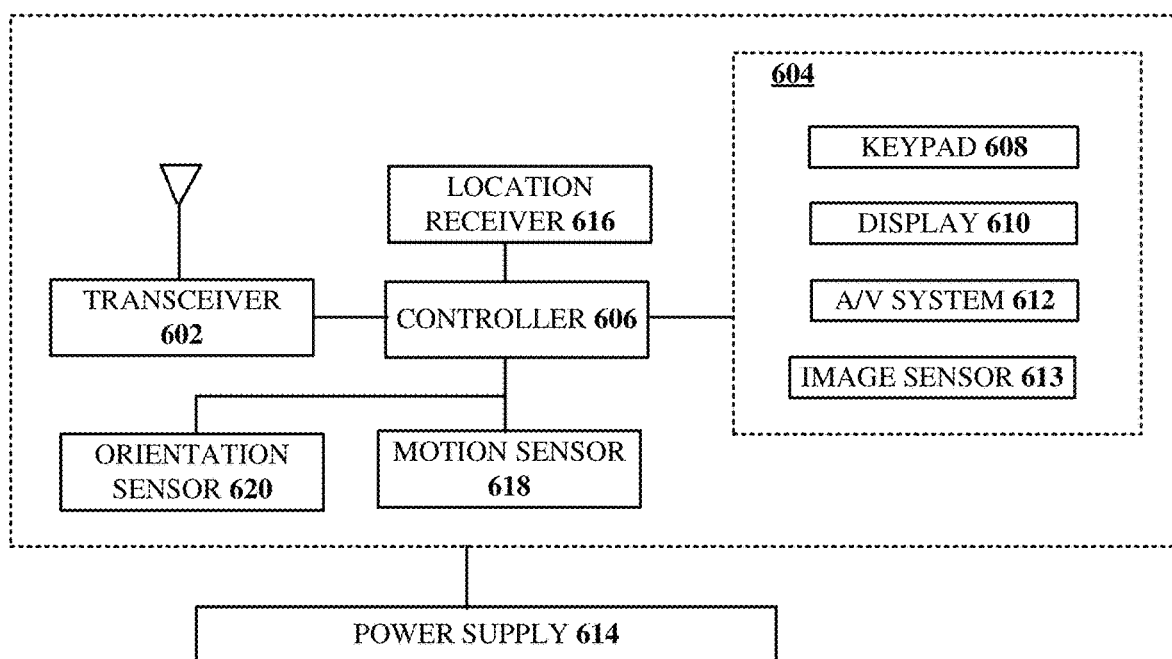
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate in whole or in part allocation/assignment (and/or sharing) of global IP addresses via use of a Global IP Address Broker.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically allocating/assigning (and/or sharing) of global IP addresses via use of a Global IP Address Broker) can employ various AI-based schemes for carrying out various embodiments thereof. Moreover, the classifier can be employed to determine a ranking or priority associated with allocating/assigning (and/or sharing) of global IP addresses via use of a Global IP Address Broker. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. An apparatus, comprising:
a processing system including a processor; and
a memory that stores executable instructions that, when executed by the processing system, facilitate performance of operations, the operations comprising:
receiving, from a first network, a first request for a first global internet protocol (IP) address that is to be allocated to a first device that is provisioned on the first network, the first device being provisioned on the first network prior to allocation of the first global IP address, the first device being provisioned on the first network via use of a first subscriber identity that is associated with the first device and that is recognized by the first network, the first request including the first subscriber identity;
generating, responsive to the first request, the first global IP address, the first global IP address enabling communication with the first device when the first device is subsequently registered on a second network, the first subscriber identity being stored in a database as corresponding to the first global IP address that is generated;
sending, to the first network, the first global IP address that had been generated;
receiving, from the second network, a second request for a second global IP address that is to be allocated to a second device that is operative on the second network, the second device being registered on the second network prior to allocation of the second global IP address, the second device being registered on the second network via use of a second subscriber identity that is associated with the second device and that is recognized by the second network, the second request including the second subscriber identity;
generating, responsive to the second request, the second global IP address, the second global IP address enabling communication with the second device when the second device is subsequently registered on the first network, the second subscriber identity being stored in the database as corresponding to the second global IP address that is generated; and
sending, to the second network, the second global IP address that had been generated.

2. The apparatus of claim 1, wherein the first global IP address is a first IPV6 address, and wherein the second global IP address is a second IPV6 address.

3. The apparatus of claim 2, wherein the first global IP address is generated based upon a first characteristic of the first device, and wherein the second global IP address is generated based upon a second characteristic of the second device.

4. The apparatus of claim 3, wherein the first characteristic is a first MAC address, and wherein the second characteristic is a second MAC address.

5. The apparatus of claim 1, wherein the first device comprises a first internet-of-things (IoT) device, and the second device comprises a second IoT device.

6. The apparatus of claim 1, wherein the operations further comprise polling the first device at the first global IP address to determine whether the first device is, at a time of the polling, registered on the first network.

7. The apparatus of claim 6, wherein the polling is carried out periodically.

8. The apparatus of claim 6, wherein the operations further comprise:
responsive to a determination that, at the time of the polling, the first device is not registered on the first network, releasing the first global IP address for subsequent allocation to another device.

9. The apparatus of claim 1, wherein:
the first network comprises a first wireless carrier network; and
the second network comprises a second wireless carrier network.

10. The apparatus of claim 1, wherein:
the processing system of the first network is part of a first server; and
the apparatus comprises a second server.

11. A method, comprising:
receiving by a processing system of a global internet protocol (IP) address broker, from a first network, a request for a global IP address that is to be associated with a device that is registered on the first network, the device being registered on the first network via use of a subscriber identity that is associated with the device and that is recognized by the first network, the device being registered on the first network prior to association of the global IP address with the device, and the request including the subscriber identity;

generating by the processing system, responsive to the request, the global IP address, the global IP address being associated in a database by the processing system along with the subscriber identity;

sending, to the first network, the global IP address that had been generated; and determining by the processing system that the device is subsequently registered on a second network, the determining being based at least in part upon the global IP address being associated in the database along with the subscriber identity.

12. The method of claim 11, wherein the determining is further based upon a communication associated with the device that is received from the second network while the device is registered on the second network.

13. The method of claim 11, wherein:
the device comprises an internet-of-things (IoT) device; and
the global IP address broker comprises a server.

14. The method of claim 11, wherein the request for the global IP address is sent to the global IP address broker by the first network responsive to a connection request being received by the first network from the device.

15. The method of claim 11, further comprising:
receiving by the processing system, from the second network, another request for another global IP address that is to be associated with another device that is registered on the second network, the another device being registered on the second network via use of another subscriber identity that is associated with the another device and that is recognized by the second network, the another device being registered on the second network prior to association of the another global IP address with the another device, and the another request including the another subscriber identity;

generating by the processing system, responsive to the another request, the another global IP address, the another global IP address being associated in the database by the processing system along with the another subscriber identity;

sending, to the second network, the another global IP address that had been generated; and determining by the processing system that the another device is subsequently registered on a third network, the determining that the another device is subsequently registered on the third network being based at least in part upon the another global IP address being associated in the database along with the another subscriber identity.

16. The method of claim 15, wherein the determining that the another device is subsequently registered on the third network is further based upon a communication associated with the another device that is received from the third network while the another device is registered on the third network.

17. A non-transitory machine-readable medium comprising executable instructions that, when executed by a processing system of a first network including a processor, facilitate performance of operations, the operations comprising:

receiving from a first device a first request for a connection to the first network, the first device having a first subscriber identity that is recognized by the first network and that is utilized to facilitate the connection;

sending to a global internet protocol (IP) address broker outside of the first network, responsive to the first request from the first device, a second request for a first global IP address that is to be associated with the first device, the second request including a characteristic of the first device; and receiving from the global IP address broker, responsive to the second request, the first global IP address, the first global IP address having been generated by the global IP address broker based upon the characteristic of the first device, the first global IP address enabling communication by the first network with the first device when the first device is subsequently connected to a second network.

18. The non-transitory machine-readable medium of claim 17, wherein the operations further comprise communicating with a second device that is connected to the second network, the communicating with the second device being facilitated via an association, by the global IP address broker, of a second global IP address with the second device.

19. The non-transitory machine-readable medium of claim 18, wherein:
the characteristic of the first device comprises a first MAC address of the first device;
the first global IP address comprises a first IPV6 address that is based upon the first MAC address of the first device;
the first device comprises a first internet-of-things (IoT) device;
the second global IP address comprises a second IPV6 address that is based upon a second MAC address of the second device; and
the second device comprises a second IoT device.

20. The non-transitory machine-readable medium of claim 17, wherein:
the processing system of the first network is part of a first server; and
the global IP address broker comprises a second server.

* * * * *